US006179742B1

(12) United States Patent
Haag et al.

(10) Patent No.: US 6,179,742 B1
(45) Date of Patent: Jan. 30, 2001

(54) TRANSMISSION ASSEMBLY FOR A POWERED SLIDING DOOR SYSTEM

(75) Inventors: Ronald Helmut Haag, Clarkston; Brian Norman Orr, Chesterfield; John Ion Moceanu, Sterling Heights; Lloyd Walker Rogers, Jr., Shelby Township, Macomb County, all of MI (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/303,337

(22) Filed: Apr. 30, 1999

(51) Int. Cl.[7] ............................ F16H 48/06; E05F 11/00
(52) U.S. Cl. ............................................. 475/154; 49/360
(58) Field of Search .................................... 475/154, 317; 49/360

(56) References Cited

U.S. PATENT DOCUMENTS 3,921,264 * 11/1975 Madonian et al. .................. 475/154
4,651,580 * 3/1987 Deane .............................. 475/154 X
4,870,875 * 10/1989 Morishita ......................... 475/154 X
5,138,795 * 8/1992 Compeau et al. ................. 49/360 X
5,447,477 * 9/1995 Bresson et al. ...................... 475/154
5,906,071 * 5/1999 Buchanan, Jr. ........................ 49/360
5,992,919 * 11/1999 Menke ............................... 49/360 X
6,038,818 * 3/2000 Haag et al. ........................... 49/360

* cited by examiner

*Primary Examiner*—Richard M. Lorence
*Assistant Examiner*—Roger Pang
(74) *Attorney, Agent, or Firm*—Patrick M. Griffin

(57) ABSTRACT

A transmission assembly for a powered sliding door system for an automotive vehicle. The transmission assembly includes a rotatable input member, a stationary hub, and a planetary gearset disposed within the hub and operatively cooperating with the input member. The transmission assembly also includes an electromagnetic brake disposed within the hub and operatively cooperating with the planetary gearset to lock and unlock a gear of the planetary gearset. The transmission assembly further includes a rotatable output member operatively cooperating with the planetary gearset.

22 Claims, 6 Drawing Sheets

TRANSMISSION ASSEMBLY FOR A POWERED SLIDING DOOR SYSTEM

TECHNICAL FIELD

The present invention relates generally to sliding door systems for vehicles and, more particularly, to a transmission assembly for a powered sliding door system for an automotive vehicle.

BACKGROUND OF THE INVENTION

It is known to provide a powered sliding door system for a vehicle such as an automotive vehicle to allow an occupant to enter and exit an occupant compartment through a door opening in a vehicle body of the automotive vehicle. The powered sliding door system typically includes a door extending longitudinally and mounted on tracks for sliding movement to open and close the door opening. The powered sliding door system includes a cable attached to the door and routed through the vehicle body via pulleys so that pulling a first end of the cable opens the door and pulling a second end of the cable closes the door. The powered sliding door system also includes an actuator assembly having first and second reels about which the ends of the cable are wrapped. The actuator assembly includes a motor that drives in one direction, rotating the first reel to open the door, and is reversible to rotate in an opposite direction, rotating the second reel to close the door.

The actuator assembly is typically mounted in a rear compartment of the vehicle body, which varies in depth, width and height. The actuator assembly has a motor mounted on the side that used a clutch and two relatively big gears to provide speed reduction to the actuator assembly. Further, the transmission assembly must provide ease of sliding door movement in both a power and manual mode of operation.

Although the above powered sliding door system has worked well, it is desirable to provide a universal transmission assembly for both right-hand and left-hand sliding doors of the automotive vehicle. It is also desirable to provide multiple stages for speed reduction of the actuator assembly. Therefore, there is a need in the art to provide a transmission assembly for a sliding power door system for an automotive vehicle.

SUMMARY OF THE INVENTION

It is, therefore, one object of the present invention to provide a transmission assembly for a powered sliding door system for an automotive vehicle.

It is another object of the present invention to provide a transmission assembly for a powered sliding door system for a vehicle, which has a smaller package size and is universal for both right-hand and left-hand sliding doors of the vehicle.

To achieve the foregoing objects, the present invention is a transmission assembly for a powered sliding door system for an automotive vehicle. The transmission assembly includes a rotatable input member, a stationary hub, and a planetary gearset disposed within the hub and operatively cooperating with the input member. The transmission assembly also includes an electromagnetic brake disposed within the hub and operatively cooperating with the planetary gearset to lock and unlock a gear of the planetary gearset. The transmission assembly further includes a rotatable output member operatively cooperating with the planetary gearset.

One advantage of the present invention is that a transmission assembly is provided for a powered sliding door system for an automotive vehicle. Another advantage of the present invention is that the transmission assembly has a planetary gearset for a smaller package size and is universal for use with right-hand and left-hand sliding doors of the automotive vehicle. Yet another advantage of the present invention is that the transmission assembly has a planetary gearset for multiple stages of speed reduction.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
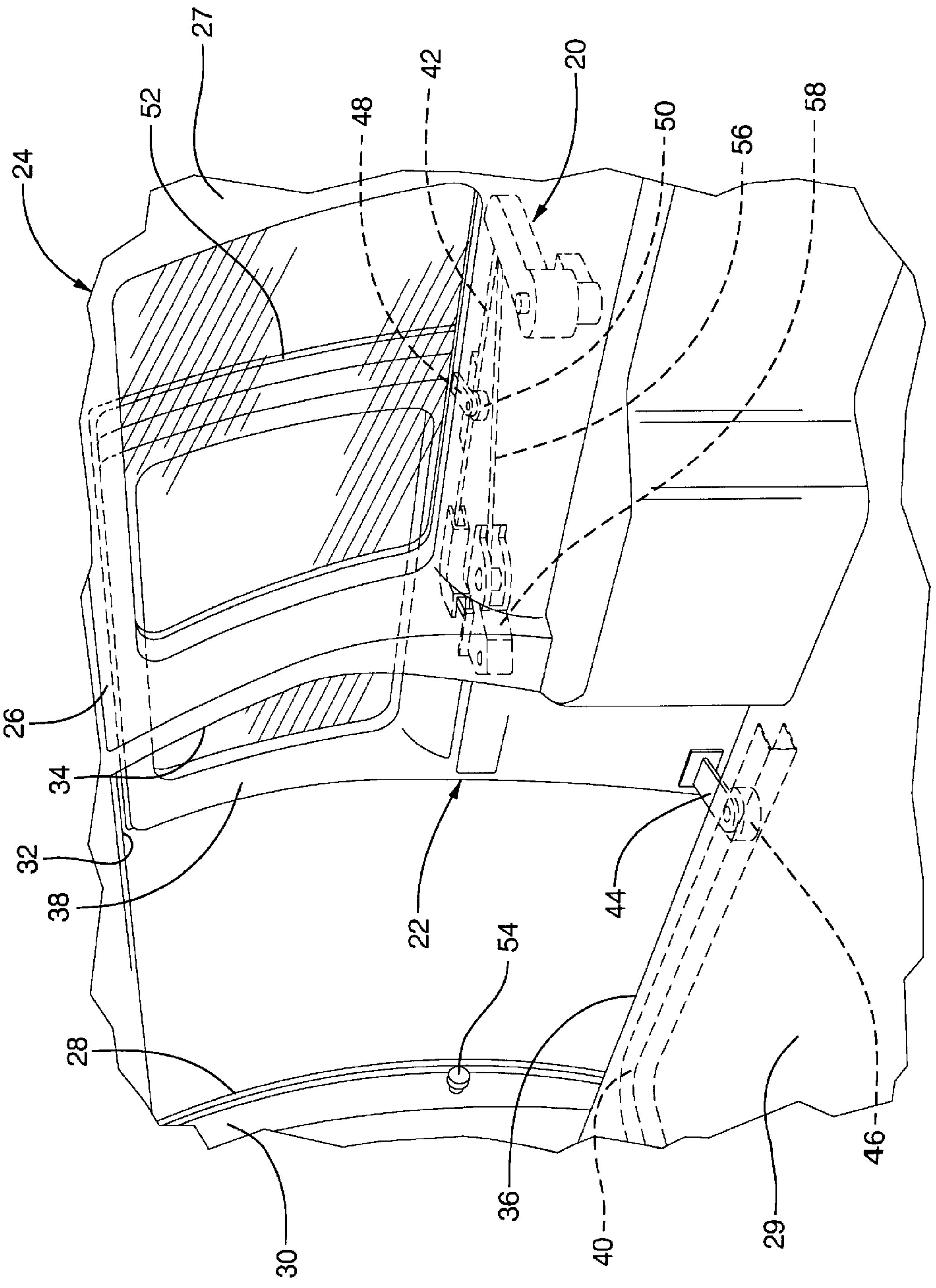
FIG. 1 is a perspective view of an actuator assembly for a powered sliding door system, according to the present invention, illustrated in operational relationship with an automotive vehicle.

Referring to the drawings and in particular FIG. 1, one embodiment of an actuator assembly 20, according to the present invention, is shown. The actuator assembly 20 is for a powered sliding door system, according to the present invention and generally indicated at 22, for a vehicle such as an automotive vehicle, generally indicated at 24. It should be appreciated that, in this example, the powered sliding door system 22 is shown for a right-hand sliding door vehicle application. It should also be appreciated that the powered sliding door system 22 may be used for a left-hand sliding door vehicle application.

The automotive vehicle 24 includes a vehicle body 26 having a side 27 with at least one door opening 28. The vehicle body 26 also has a floor 29 operatively connected to the side 27. The vehicle body 26 has a front pillar 30, roof rail 32, rear pillar 34 and rocker arm 36 forming the door opening 28. It should be appreciated that the vehicle body 26 is conventional and known in the art.

The powered sliding door system 22 includes a sliding door 38 for closing the door opening 28. The powered sliding door system 22 also includes a lower track 40 mounted beneath the floor 29 and an upper track 42 mounted on the side 27 of the vehicle body 26. The sliding door 38 includes a lower arm 44 at a bottom thereof extending inboard and carrying a roller 46 that rides in the lower track 40. The sliding door 38 also includes an upper arm 48 extending inboard and carrying a roller 50 that rides in the upper track 42. It should be appreciated that sliding movement of the sliding door 38 is enabled by the travel of the rollers 46 and 50 within the lower track 40 and upper track 42, respectively.

The tracks 40 and 42 are curved inwardly at a forward end thereof so that the sliding door 38 glides inwardly to close the door opening 28 as the sliding door 38 reaches the fully closed position. The sliding door 38 includes a weather-strip 52 carried thereon and compresses against the vehicle body 26 when the sliding door 38 reaches the closed position. The sliding door 38 also includes a door latch (not shown) for latching with a striker 54 mounted on the vehicle body 26 to latch the sliding door 38 in a closed position disposed within the door opening 28. It should be appreciated that the latch may be electronically activated to open as is known in the art. It should also be appreciated that, up to this point in the description, the powered sliding door system 22 is conventional and known in the art.

Figure 2:
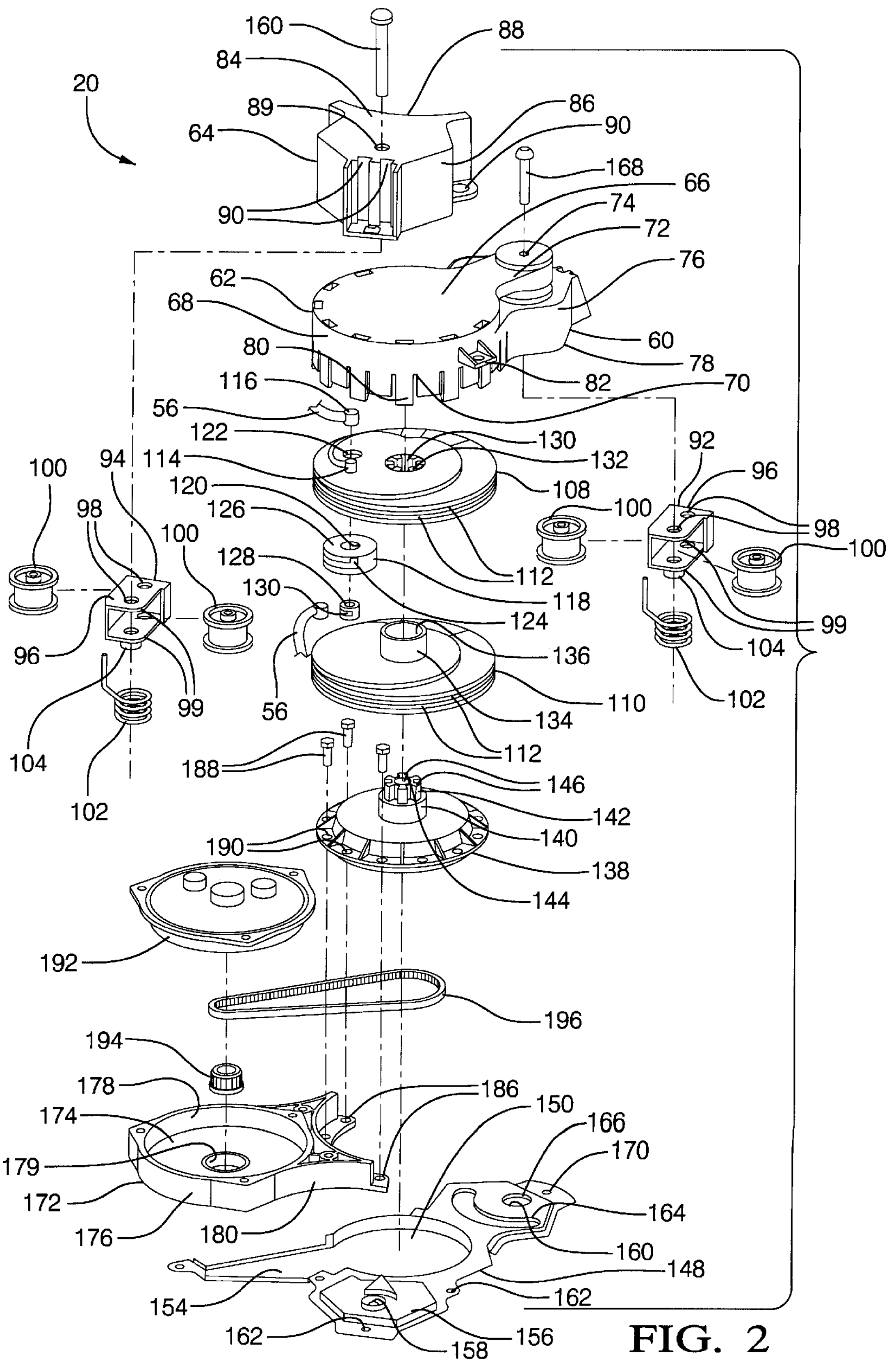
FIG. 2 is an exploded view of the actuator assembly for the powered sliding door system of FIG. 1.

Referring to FIGS. 1 and 2, the powered sliding door system 22 includes the actuator assembly 20 mounted rearwardly of the sliding door 38 and to the side 27 of the vehicle body 26 for moving the sliding door 38. The powered sliding door system 22 includes a cable 56 having one end connected to the upper arm 48 and extending through the curved forward end of the upper track 42 and threaded through grommets (not shown) and into a guide sleeve 58 attached to the side 27 of the vehicle body 26. The guide sleeve 58 carries a pulleys (not shown) mounted on an axles (not shown) and routes the cable 56 to the actuator assembly 20 to pull the door 38 forwardly towards the closed position and rearwardly towards the open position. It should be appreciated that the cable 56 and guide sleeve 58 are conventional and known in the art.

Figure 2A:
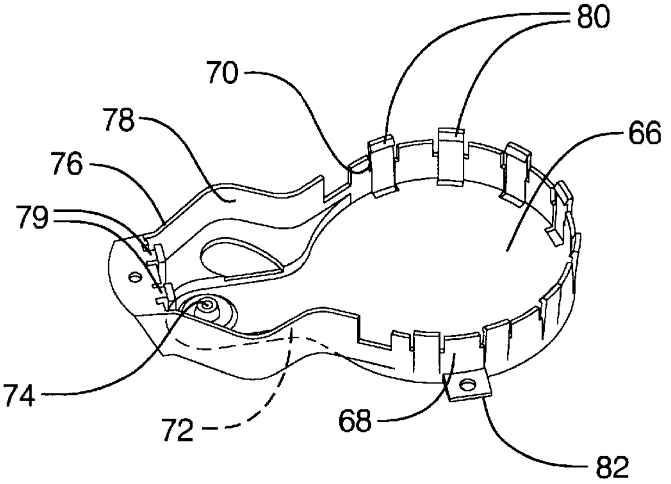
FIG. 2A is a perspective view of a housing of the actuator assembly of FIG. 2.
Figure 2B:
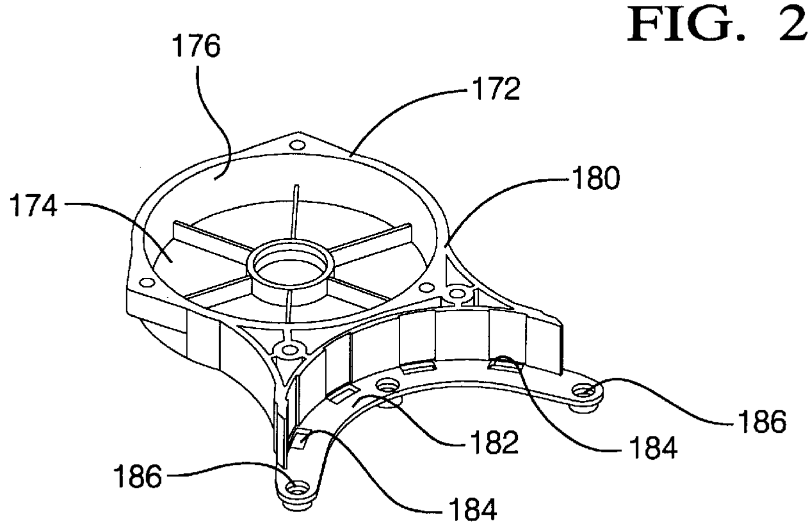
FIG. 2B is a perspective view of a motor bracket of the actuator assembly of FIG. 2.

Referring to FIGS. 2 and 2A, the actuator assembly 20, according to the present invention, includes a housing, generally indicated at 60, having a main housing 62 and an auxiliary housing 64. The main housing 62 has a generally planar and circular base wall 66 and a side wall 68 generally perpendicular to and circumscribing and outer periphery of the base wall 66 to form a drum or reel cavity 70. The main housing 62 has a handle shaped extension wall 72 extending radially from the base wall 66 with an aperture 74 extending axially therethrough. The main housing 62 has a side wall 76 generally perpendicular to and extending from the extension wall to form a tensioner cavity 78. The side wall 76 has at least one, preferable a pair of apertures 79 extending therethrough to allow the cable 56 to extend into the tensioner cavity 78. The main housing 62 has a plurality of adjustment tabs 80 extending axially from and spaced circumferentially about the side wall 68 for a function to be described. The main housing 62 includes at least one, preferably a plurality of flanges 82 extending radially from the side wall 68 for attachment to the side 27 of the vehicle body 26.

The auxilly housing 64 has a generally planar and arcuate base wall 84 and a side wall 86 generally perpendicular to and circumscribing and outer periphery of the base wall 84 to form a tensioner cavity 88. The side wall 86 includes at least one, preferably a pair of apertures 89 extending therethrough to allow the cable 56 to extend into the tensioner cavity 88. The base wall 84 has an opposed pair of apertures 90 extending axially therethrough for a function to be described.

The actuator assembly 20 includes a first tensioner 92 disposed within the tensioner cavity 78 of the main housing 62 and a second tensioner 94 disposed within the tensioner cavity 88 of the auxiliary housing 64. Each of the first tensioner 92 and second tensioner 94 include a generally C-shaped bracket 96 having a pair of apertures 98 extending through opposed walls 99 of the bracket 96. Each of the tensioners 92 and 94 include a pair of rollers or pulleys 100 rotatably disposed between the opposed walls 99 and apertures 98 of the bracket 96. Each of the tensioners 92 and 94 further include a spring 102 disposed about a projection 104 on the bracket 96. The spring 102 is of a coil type and has one end attached to the bracket 96 and another end attached to the housing 60. It should be appreciated that the cable 56 extends through the rollers 100 and that the tensioners 92 and 94 take up slack in the cable 56. It should be appreciated that the tensioners 92 and 94 are conventional and known in the art.

The actuator assembly 20 includes a first cable drum or reel 108 for one end of the cable 56 and a second cable drum or reel 110 for another end of the cable 56. The cable reels 108 and 110 are disposed in the reel cavity 10 of the main housing 62. The cable reels 108 and 110 are generally cylindrical in shape and have a generally circular cross-section. The cable reels 108 and 110 extend axially and have a plurality of grooves 112 in their outer periphery for the cable 56. The first cable reel 108 has a locking recess 114 to receive a locking member 116 of the end of the cable 56 to lock the one end of the cable 56 to the first cable reel 108.

The actuator assembly 20 includes a cable member 118 disposed between the first cable reel 108 and the second cable reel 110. The cable member 118 has a projection 120 which extends axially through an aperture 122 in the first cable reel 108. The cable member 118 is generally circular in shape and has a groove 124 extending along an outer periphery thereof. The cable member 118 also has an aperture 126 centrally located and extending axially therethrough. The cable member 118 includes a locking member 128 disposed in the aperture 126 and having a groove 130 therein. Another end of the cable 56 is routed through the cable member 118 and into the locking member 128 to secure the cable 56 to the cable member 118. It should be appreciated that the cable member 118 is sandwiched between the first cable reel 108 and second cable reel 110 and rotates with the first cable reel 108. It should also be appreciated that rotation of the first cable reel 108 causes the second cable reel 110 to rotate due to the cable member 118 being mounted to the first cable reel 108. It should further be appreciated that the cable 56 is wound on one of the cable reels 108,110 and is unwound on the other of the cable reels 108,110 when the cable reels 108,110 are rotated in one direction.

The first cable reel 108 has an aperture 130 centrally located and extending axially therethrough. The first cable reel 108 has a plurality of spline teeth 132 disposed cirumferentially about the aperture 130 for engagement with a coupling to be described. The second cable reel 110 has a projection 134 centrally located and extending axially. The projection 134 is generally cylindrical and has an aperture 136 extending axially therethrough. It should be appreciated that the projection 134 abuts the first cable reel 108. It should also be appreciated that the cable reels 108 and 110 are different for a right-hand and left-hand arrangement.

Figure 3A:
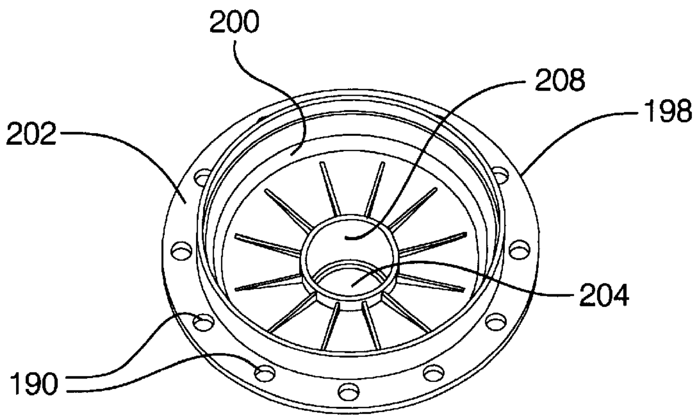
FIG. 3A is a perspective view of a hub for the transmission assembly of FIG. 3.
Figure 3:
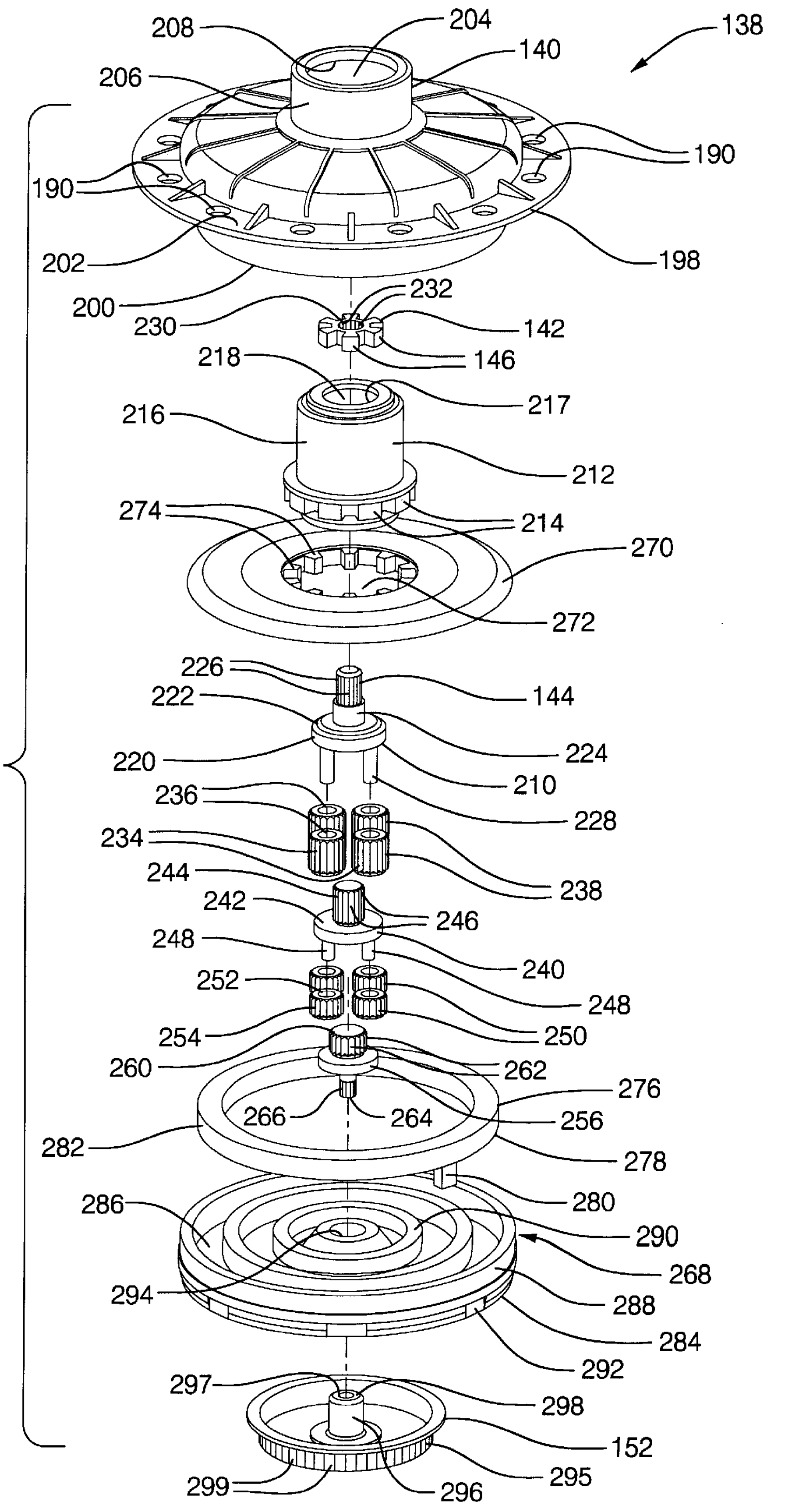
FIG. 3 is an exploded view of a transmission assembly, according to the present invention, of the actuator assembly for the powered sliding door system of FIG. 1.

Referring to FIGS. 2 and 3, the actuator assembly 20 includes a transmission assembly, according to the present invention and generally indicated at 138, disposed within the reel cavity 70 of the main housing 62. The transmission assembly 138 has a large step down ratio. The transmission assembly 138 is generally circular in shape and disposed adjacent the second cable reel 110. The transmission assembly 138 has a projection 140 which extends through the aperture 136 of the projection 134 of the second cable reel 110.

The actuator assembly 20 also includes a coupling 142 disposed about an output member 144 of the transmission assembly 138 and in the aperture 130 of the first cable reel 108. The coupling 142 is generally circular in shape and has a plurality of spline teeth 146 to engage the spline teeth 132 of the first cable reel 108. It should be appreciated that rotation of the output member 144 of the transmission assembly 138 causes rotation of the first cable reel 108 via the coupling 142.

The actuator assembly 20 also includes a housing bracket 148 for attachment to the side 27 of the vehicle body 26. The housing bracket 148 has a cavity portion 150 for an input member 152 of the transmission assembly 138 and a belt portion 154 extending radially from the cavity portion 150 for a belt 196 disposed about the input member 152 of the transmission assembly 138 to be described. The housing bracket 148 also has an auxiliary portion 156 extending radially from the cavity portion 150 to support the second tensioner 94. The auxiliary portion 156 has a recess 158 for the projection 104 of the bracket 98 of the second tensioner 94. The auxiliary housing 64 is attached to the auxiliary portion 156 by suitable means such as fasteners 160 extending through apertures 90 in the auxially housing 64 and apertures 162 in the auxiliary portion 156 of the housing bracket 148. The housing bracket 148 also includes a tensioner portion 164 extending radially to support the first tensioner 92. The tensioner portion 164 includes a recess 166 for the projection 104 of the bracket 98 of the first tensioner 92. The main housing 62 is attached to the housing bracket 148 by suitable means such as fasteners 168 that extend through the aperture 74 of the main housing 60 and apertures 170 of the tensioner portion 164.

The actuator assembly 20 includes a motor bracket 172 attached to the transmission assembly 138. The motor bracket 172 has a generally planar and circular base wall 174 and a side wall 176 generally perpendicular to the base wall to form a motor cavity 178. The base wall 174 has an aperture 179 extending axially therethrough for a function to be described. The motor bracket 172 includes an attachment portion 180 extending radially outwardly from the side wall 176. The attachment portion 180 has a flange 182 that is generally planar and arcuate in shape. The flange 182 has a plurality of slots 184 extending axially therethrough and spaced circumferentially to receive the adjustment tabs 80 of the main housing 62. The flange 182 also has a plurality of apertures 186 circumferentially spaced about and extending axially through the flange 182. The motor bracket 172 is attached to the transmission assembly 138 by suitable means such as fasteners 188 extending through apertures 190 in the transmission assembly 138 and the apertures 186 in the motor bracket 172.

The actuator assembly 20 includes a motor 192 disposed within the motor cavity 178 of the motor bracket 172. The motor 192 is of a flat armature disc or pancake type as is known in the art. This type of motor has very low cogging which assists with back driving in a manual mode of operation. The motor 192 has a very thin package size or height, but provides sufficient torque. The motor 192 is connected to a source of power such as a controller (not shown). The motor 192 is connected to the motor bracket 172 by suitable means such as fasteners (not shown). The motor 192 is mounted as a side mount via the motor bracket 172 relative to the transmission assembly 138.

The actuator assembly 20 includes a drive sprocket 194 connected to an output shaft (not shown) of the motor 192. The drive sprocket 194 is generally circular in shape and extends axially through the aperture 179 in the motor bracket 172. The actuator assembly 20 further includes a belt 196 interconnecting the drive sprocket 194 and the input member 152 of the transmission assembly 138 to be described.

Figure 4:
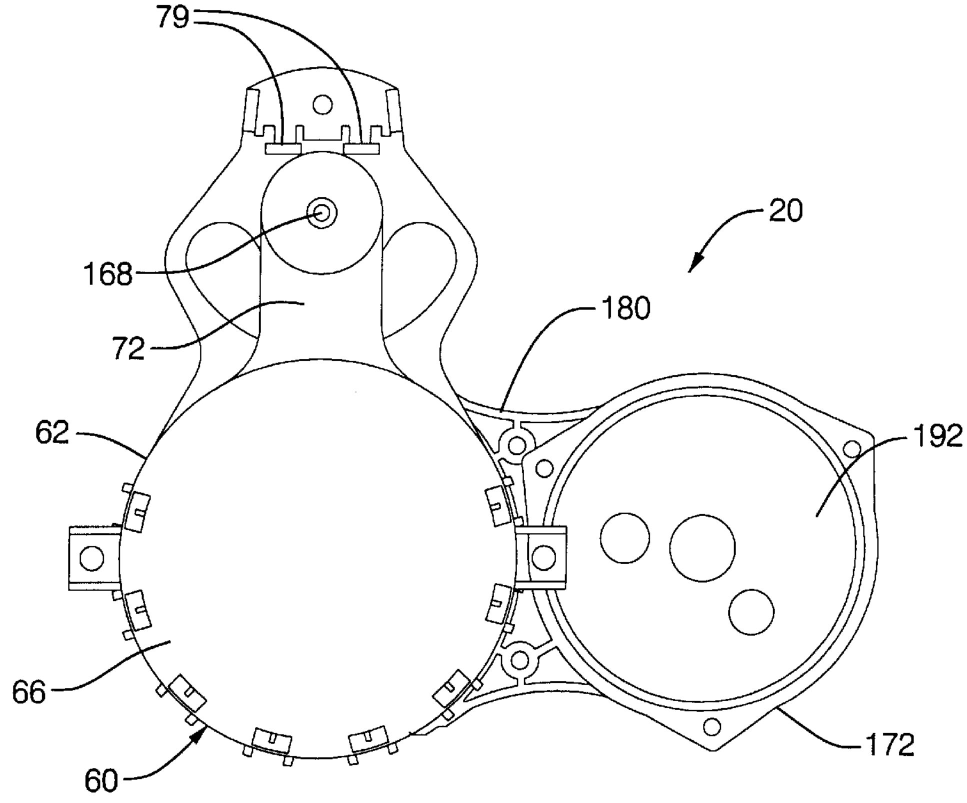
FIG. 4 is an elevational view of the actuator assembly for the powered sliding door system of FIG. 1 illustrated in a first operative position.
Figure 5:
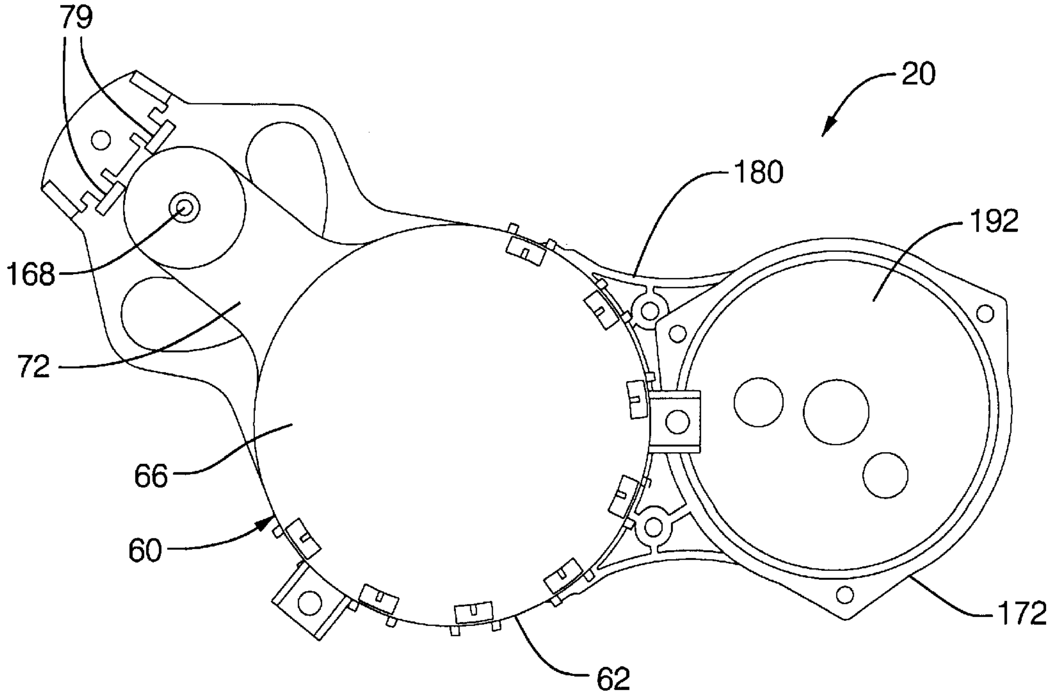
FIG. 5 is a view similar to FIG. 4 of the actuator assembly for the powered sliding door system of FIG. 1 illustrating a second operative position.
Figure 6:
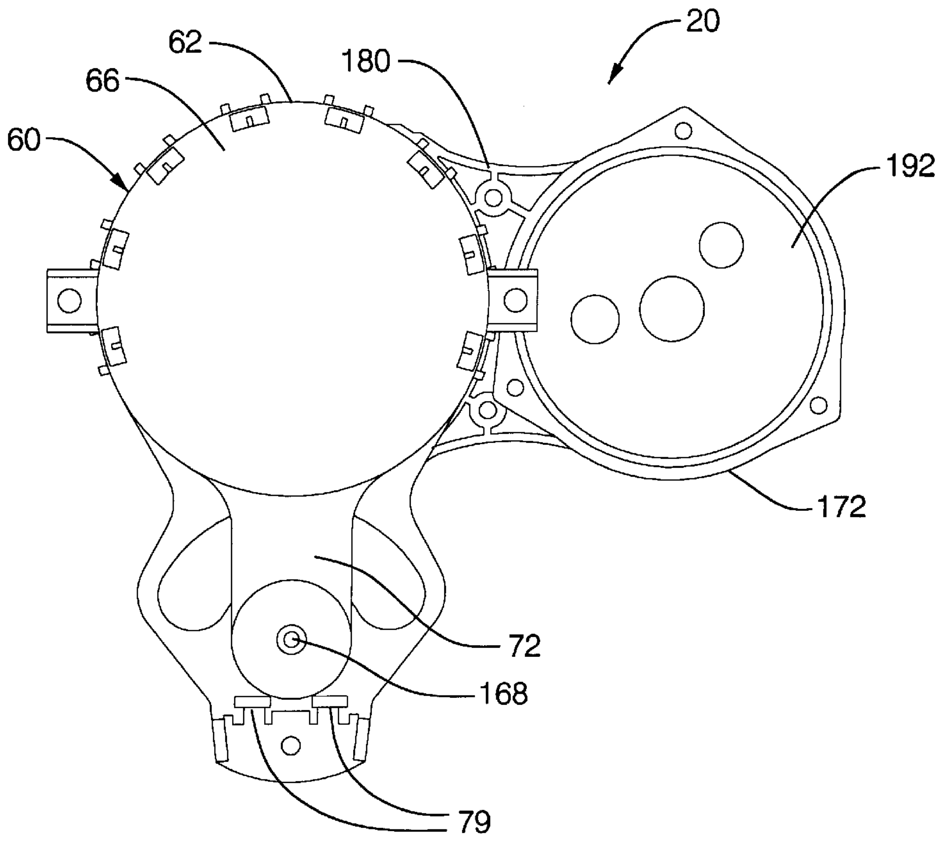
FIG. 6 is a view similar to FIG. 4 of the actuator assembly of the powered sliding door system of FIG. 1 illustrating a third operative position.

In assembly of the actuator assembly 20, the actuator assembly 20 is attached to the side 27 of the vehicle body 26 for either a right-hand or left-hand sliding door 38. The actuator assembly 20 is symmetrical about a centerline to provide a multiple or infinite mounting positions to create a right-hand or left-hand assembly. The main housing 62 is rotated to position the front or first tensioner 92 in an optimum direction for the cable 56 and locked into position relative to the motor bracket 172 via the tabs 80 in the main housing 62 and slots 184 in the motor bracket 172. The rear of second tensioner 94 is positioned and fastened to the housing bracket 148. As illustrated in FIG. 4, the main housing 62 is located relative to the motor bracket 172 to form a right-hand actuator assembly. The main housing 62 is rotated one hundred eighty degrees relative to the motor bracket 172 to form a left-hand actuator assembly as illustrated in FIG. 6. The main housing 62 can be rotated relative to the motor bracket 172 somewhere in between that of FIG. 4 and 6 to form an intermediate actuator assembly between the tensioners 92 and 94 as illustrated in FIG. 5. It should be appreciated that the housing bracket 148 and auxiliary housing 64 are not shown in FIGS. 4 through 6. It should also be appreciated that the housing bracket 148 is vehicle specific from the right-hand to left-hand side 27 of the automotive vehicle 12 and from vehicle to vehicle and is manufactured for that particular arrangement.

Referring to FIGS. 3 and 3A, the transmission assembly 138 includes a hub 198 having a generally annular shape. The hub 198 includes a cavity 200 in one end and a flange 202 extending radially and circumferentially thereabout. The hub 198 includes the plurality of apertures 190 extending axially through the flange 202 and disposed circumferentially about a periphery thereof. The hub 198 has the projection 140 extending axially from one end thereof. The projection is generally cylindrical in shape and has an aperture 204 extending axially therethrough. The projection 140 has an outer surface 206 that acts as a concentric bearing and locating surface for the second cable reel 110. The projection 140 has an inner surface 208 that acts as a concentric bearing surface for a ring gear 212 to be described. The hub 198 is made of a material known as AcuZinc that allows lower friction between surfaces sliding against each other and eliminates the need for ball bearings. It should be appreciated that the hub 198 is fixed and acts as a side load-carrying member to the cable reels 108 and 110.

The transmission assembly 138 also includes a planetary gearset, generally indicated at 210, contained within the hub 198. The planetary gearset 210 includes a ring gear 212 having a plurality of teeth 214 and an extension 216 extending axially and disposed within the projection 206 of the hub 198. The extension 216 has a cavity 217 and an aperture 218 extending axially therethrough. The ring gear 212 is made of the AcuZinc material. The ring gear 212 is a reactionary member that may be free wheeling or locked via an electromagnetic brake to be described.

The planetary gearset 210 includes a first carrier 220 disposed within the cavity 217 of the ring gear 212. The first carrier 220 has a generally annular and planar base 222 and the output member 144 extending axially from the base 222. The output member 144 has a shaft 224 with a plurality of teeth 226 disposed circumferentially thereabout. The first carrier 220 also includes a plurality of, preferably four, arms 228 extending axially from the other side of the base 22 and disposed circumferentially thereabout for a function to be described.

The transmission assembly 138 also includes the coupling 142 for coupling the output member 144 of the planetary gearset 210 to the first cable reel 108. The coupling 142 is generally annular in shape and has an aperture 230 extending axially therethrough. The coupling 142 has a plurality of teeth 232 disposed circumferentially about the aperture 230 and engaging the teeth 226 on the shaft 224 of the output member 144. The coupling 142 is disposed adjacent the extension 216 of the ring gear 212. The coupling 142 has the plurality of spline teeth 146 disposed circumferentially about a periphery thereof and engaging the spline teeth 132 on the first reel 108. The coupling 142 has even numbers of the spline teeth 146 that act in pairs on the opposing side of their edges when the transmission assembly 138 is in motion. As a result, there is no side loading on the output member 144 and the transmission assembly 138 is self-centering due to a generous clearance between the spline teeth 146 and the spline teeth 132 on the first cable reel 108. This allows each element of the transmission assembly 138, through the output member 144, to free-float within reasonable limits, which optimizes the efficiency of the transmission assembly 138. This reduces the need for very high tolerance parts within the transmission assembly 138.

The planetary gearset 210 includes a plurality of, preferably four, first planetary gears 234 disposed on the arms 228 of the first carrier 220. The first planetary gears 234 extend axially and are generally annular in shape. The first planetary gears 234 have an aperture 236 extending axially therethrough to be disposed about the arms 228 of the first carrier 220. The first planetary gears 234 have a plurality of teeth 238 disposed circumferentially thereabout for a function to be described.

The planetary gearset 210 includes a second carrier 240 disposed within the cavity 217 of the ring gear 212. The second carrier 240 has a generally annular planar base 242 and a shaft 244 extending axially from the base 242. The shaft 244 has a plurality of teeth 246 disposed circumferentially thereabout. The shaft 244 is disposed between the first planetary gears 234 such that the teeth 246 of the shaft 244 engage the teeth 238 of the first planetary gears 234. The second carrier 240 also includes a plurality of, preferably four, arms 248 extending axially from the other side of the base 242 and disposed circumferentially thereabout for a function to be described.

The planetary gearset 210 includes a plurality of, preferably four, second planetary gears 250 disposed on the arms 248 of the second carrier 240. The second planetary gears 250 extend axially and are generally annular in shape. The second planetary gears 250 have an aperture 252 extending axially therethrough to be disposed about the arms 248 of the second carrier 240. The second planetary gears 250 have a plurality of teeth 254 disposed circumferentially thereabout for a function to be described.

The planetary gearset includes a pinion/sun gear 256 disposed within the cavity 217 of the ring gear 212. The pinion/sun gear 256 has a generally annular planar base 258 and a shaft 260 extending axially from the base 258. The shaft 260 has a plurality of teeth 262 disposed circumferentially thereabout to function as a pinion gear. The shaft 260 is disposed between the second planetary gears 250 such that the teeth 262 engage the teeth 254 of the second planetary gears 250. The pinion/sun gear 256 also has a shaft 264 extending axially from the other side of the base 260. The shaft has a plurality of teeth 266 disposed circumferentially thereabout to function as a sun gear in a manner to be described.

The transmission assembly 138 includes an electromagnetic brake, generally indicated at 268, contained within the cavity 200 of the hub 198. The electromagnetic brake 268 includes a friction plate 270 disposed within the cavity 200 of the hub 198 and about the ring gear 212. The friction plate 270 is generally annular in shape with an aperture 272 extending axially therethrough. The friction plate 270 includes a plurality of teeth 274 disposed circumferentially about the aperture 272 for engaging the teeth 214 of the ring gear 212.

The electromagnetic brake 268 also includes a bobbin subassembly 276 disposed within the cavity 200 of the hub 198. The bobbin subassembly 276 includes a bobbin 278 being generally planar and having at least one foot 280 extending axially therefrom for a function to be described. The bobbin subassembly 276 also includes a coil 282 disposed adjacent the bobbin 278. The coil 282 is a generally annular winding of copper wire. It should be appreciated that the coil 282 is connected to a source of power such as a controller (not shown).

The electromagnetic brake 268 further includes a magnet subassembly 284 disposed adjacent the bobbin subassembly 276 and within the cavity 200 of the hub 198. The magnet subassembly 284 includes a generally annular and planar base 286 having a magnet 288 disposed about the periphery thereof. The magnet subassembly also includes an annular insert 290 disposed within the base 286. The base 286 has at least one, preferably a plurality of recesses 292 for the foot 280 of the bobbin 278. The base 286 an aperture 294 extending therethrough for a function to be described. It should be appreciated that, when the coil 282 receives power, the magnet 288 creates an electromagnetic field that stops rotation of the friction plate 270.

When the electromagnetic brake 268 is activated by the controller, the ring gear 212 is locked by the friction plate 270 and the maximum ratio of the transmission assembly 138 is activated which provides the proper speed reduction and torque at the output member 144. When the electromagnetic brake 268 has no power applied by the controller, the ring gear 212 can rotate freely which essentially allows a bypassing effect of the transmission assembly 138. In this mode, we have a 1:1 ratio and the transmission assembly 138 can be back driven so as to provide a means for manually operating the sliding door 38.

The transmission assembly 138 includes the input member 152. The input member 152 has a driven pulley 295 disposed adjacent the magnet subassembly 284. The driven pulley 295 is generally annular in shape. The input member 153 has an extension 296 extending axially from the driven pulley 295 with a cavity 297 therein. The extension 296 has a plurality of teeth 298 disposed circumferentially within the cavity 297 for receiving and engaging the teeth 266 of the shaft 264 of the pinion/sun gear 240. The driven pulley 295 also has a plurality of teeth 299 disposed about a periphery thereof. The teeth 299 engage corresponding teeth (not shown) on the belt 196 thereof.

In operation of the actuator assembly 20 and the transmission assembly 138, the motor 192 is activated by power from a power source such as a controller (not shown). The motor 192 rotates its output shaft (not shown) in a clockwise direction, thereby rotating the sprocket 194, belt 196 and driven pulley 295 of the input member 152 in a clockwise direction. The input member 152, in turn, rotates the pinion/sun gear 256 clockwise, in turn, rotating the second planetary gears 250, second carrier 240, first planetary gears 234, first carrier 220 and output member 144 such that the coupling 142 and first cable reel 108 rotate clockwise. The first cable reel 108 winds the cable 56 thereon through the first tensioner 92 to pull the cable 56 to move the sliding door 38 rearwardly to the open position. As the first cable reel 108 rotates, the second cable reel 110 also rotates to unwind the cable 56 thereon through the second tensioner 94. When the door is fully open, the controller ceases power to the motor 192. The belt 196 provides a three to one speed reduction and the planetary gearset 210 provides a twenty to one speed reduction.

To close the sliding door 38, the controller resumes power to the motor 192 of the actuator assembly 20 and the motor 192 rotates the sprocket 194 in a counterclockwise direction, in turn, rotating the belt 196 and driven pulley 295 of the input member 152 counterclockwise. The input member 152, in turn, rotates the pinion/sun gear 256 counterclockwise, in turn, rotating the second planetary gears 250, second carrier 240, first planetary gears 234, and first carrier 220 such that the coupling 142, first cable reel 108 and second cable reel 110 rotate counterclockwise. The second cable reel 110 winds the cable 56 thereon through the second tensioner 94 to pull the cable 56 to move the sliding door 38 forwardly to the closed position. The first cable reel 108 unwinds the cable 56 therefrom through the first tensioner 92. When the sliding door 38 is fully closed, the controller ceases power to the motor 192. It should be appreciated that the tensioners 92 and 94 take up any slack in the cable 56.

Figure 7:
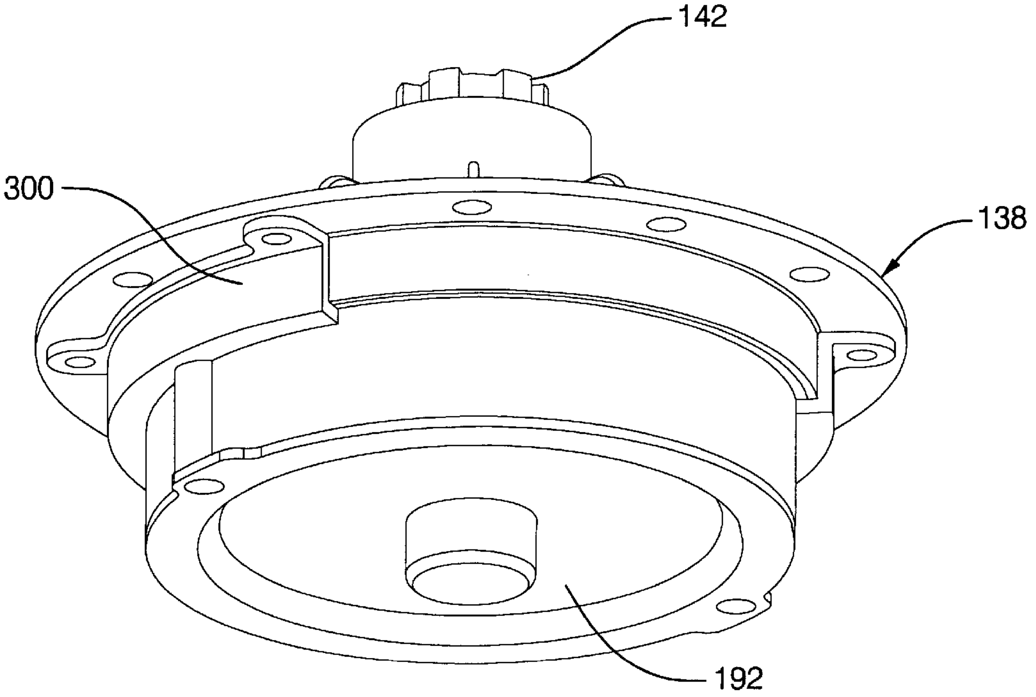
FIG. 7 us a perspective view of a motor mounted directly behind the transmission assembly of FIG. 3.

Alternatively, if depth is not a major factor in packaging the actuator assembly 20, the motor bracket 172 and belt 196 can be eliminated. In this embodiment, the motor 192 is centered mounted directly to a rear of the transmission assembly 138 with another motor bracket 300 attached to the back of the transmission assembly 138 as illustrated in FIG. 7. This adds approximately 15 mm to the depth, but frees up longitudinal space. It should be appreciated that, in this embodiment, an additional gear stage (not shown) is added in the space of the ring gear for the speed reduction between the motor 192 and the planetary gearset 210.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A transmission assembly for a powered sliding door system in an automotive vehicle comprising:

a rotatable input member;

a stationary hub having a projection extending axially from one end thereof with an inner surface, said projection extending axially away from said rotatable input member;

a planetary gearset disposed within said hub and operatively cooperating with said input member, said planetary gearset having a ring gear disposed in said projection and said inner surface acting as a concentric bearing surface for said ring gear;

an electromagnetic brake disposed within said hub and operatively cooperating with said planetary gearset to lock and unlock said ring gear of said planetary gearset; and a rotatable output member operatively cooperating with said planetary gearset.

2. A transmission assembly as set forth in claim 1 wherein said electromagnetic brake comprises friction plate disposed about a gear of said planetary gearset, a bobbin subassembly disposed adjacent said friction plate and a magnet subassembly disposed adjacent said bobbin subassembly.

3. A transmission assembly as set forth in claim 2 wherein said bobbin subassembly comprises an annular bobbin and an annular coil disposed adjacent said bobbin.

4. A transmission assembly as set forth in claim 2 wherein said magnet assembly comprises an annular magnet and an insert disposed adjacent said magnet.

5. A transmission assembly as set forth in claim 1 wherein said gear of said planetary gearset includes a ring gear and an extension extending axially from said ring gear and having a cavity therein.

6. A transmission assembly as set forth in claim 5 wherein said planetary gearset includes a first carrier disposed in said cavity and having shaft extending through said extension.

7. A transmission assembly as set forth in claim 6 wherein said output member is disposed adjacent said extension and about said shaft of said first carrier.

8. A transmission assembly as set forth in claim 6 including a plurality of first planetary gears connected to said first carrier and disposed within said cavity.

9. A transmission assembly as set forth in claim 7 including a second carrier having a shaft extending axially and disposed between said first planetary gears for engagement therewith.

10. A transmission assembly as set forth in claim 9 including a plurality of second planetary gears connected to said second carrier.

11. A transmission assembly as set forth in claim 10 including a pinion/sun gear having a first shaft extending axially and disposed between said second planetary gears for engagement therewith and a second shaft extending axially for engagement with said input member.

12. A transmission assembly as set forth in claim 1 wherein said input member is a driven pulley.

13. A transmission assembly for a powered sliding door system in an automotive vehicle comprising:

a rotatable input member;

a stationary hub having a projection extending axially from one end thereof with an inner surface, said projection extending axially away from said rotatable input member;

a planetary gearset disposed within said hub and operatively cooperating with said input member, said planetary gearset including a ring gear disposed in said projection and said inner surface acting as a concentric bearing surface for said ring gear;

an electromagnetic brake disposed within said hub and operatively cooperating with said ring gear of said planetary gearset to selectively hold said ring gear stationary; and a rotatable output member operatively cooperating with said planetary gearset, said planetary gearset reducing a speed of said output member relative to said input member.

14. A transmission assembly as set forth in claim 13 wherein said electromagnetic brake comprises friction plate disposed about said ring gear of said planetary gearset, a bobbin subassembly disposed adjacent said friction plate and a magnet subassembly disposed adjacent said bobbin subassembly.

15. A transmission assembly as set forth in claim 13 wherein said planetary gearset includes an extension extending axially from said ring gear and having a cavity therein.

16. A transmission assembly as set forth in claim 15 wherein said planetary gearset includes a first carrier disposed in said cavity and having shaft extending through said extension.

17. A transmission assembly as set forth in claim 16 wherein said output member is disposed adjacent said extension and about said shaft of said first carrier.

18. A transmission assembly as set forth in claim 17 including a plurality of first planetary gears connected to said first carrier and disposed within said cavity.

19. A transmission assembly as set forth in claim 18 including a second carrier having a shaft extending axially and disposed between said first planetary gears for engagement therewith and a plurality of second planetary gears connected to said second carrier.

20. A transmission assembly as set forth in claim 19 including a pinion/sun gear having a first shaft extending axially and disposed between said second planetary gears for engagement therewith and a second shaft extending axially for engagement with said input member.

21. A transmission assembly for a powered sliding door system in an automotive vehicle comprising:

a rotatable input member;

a stationary hub having a projection extending axially from one end thereof with an inner surface;

a planetary gearset disposed within said hub and operatively cooperating with said input member, said planetary gearset including a ring gear disposed in said projection and said inner surface acting as a concentric bearing surface for said ring gear;

an electromagnetic brake disposed within said hub and operatively cooperating with said planetary gearset to lock and unlock said ring gear of said planetary gearset; and a rotatable output member operatively cooperating with said planetary gearset;

a coupling connected to said output member and disposed adjacent said hub and having a plurality of spline teeth for cooperating with a cable reel such that there is no side loading on said output member and said transmission assembly is self-centering.

22. A transmission assembly for a powered sliding door system in an automotive vehicle comprising:

a rotatable input member;

a stationary hub;

a planetary gearset disposed within said hub and operatively cooperating with said input member;

an electromagnetic brake disposed within said hub and operatively cooperating with said planetary gearset to lock and unlock a ring gear of said planetary gearset;

a rotatable output member operatively cooperating with said planetary gearset;

a coupling connected to said output member and disposed adjacent said hub and having a plurality of spline teeth for cooperating with a cable reel such that there is no side loading on said output member and said transmission assembly is self-centering; and wherein said hub has an inner surface and an outer surface which act as a concentric bearing surface for said ring gear and a cable drum, respectively.

* * * * *